Oct. 29, 1968

P. K. BODGE 3,407,675

SPEED-SHIFT TRANSMISSION

Filed Oct. 28, 1966

INVENTOR
PHILIP K. BODGE
BY
Thomson & Mrose
ATTORNEYS

Oct. 29, 1968

P. K. BODGE 3,407,675

SPEED-SHIFT TRANSMISSION

Filed Oct. 28, 1966

INVENTOR
PHILIP K. BODGE
BY
Thomson & Mrose
ATTORNEYS

PHILIP K. BODGE
BY
Thomson & Mrose
ATTORNEYS

United States Patent Office 3,407,675
Patented Oct. 29, 1968

3,407,675
SPEED-SHIFT TRANSMISSION
Philip K. Bodge, Andover, Mass., assignor to Insco Corporation, Groton, Mass., a corporation of Massachusetts
Filed Oct. 28, 1966, Ser. No. 590,255
14 Claims. (Cl. 74—329)

ABSTRACT OF THE DISCLOSURE

In a selectable-speed mechanical transmission, the clutch elements of a circular array of driving clutch elements each rotated at a distinctive speed are separately and selectively engageable with cooperating driven clutch elements which are all geared in driving relation to an output shaft, the driving and driven clutch elements normally being yieldably biased out of engagement and the speed selections being effected by selectably and independently overcoming the biasing associated with different ones of the clutch elements.

---

The present invention relates to improvements in the changing of speed translations in mechanical drives, and in one particular aspect, to novel and improved instrument-drive mechanisms of low-costs, reliable and uncomplicated construction which lend themselves to positive remote, automatic or direct manual coupling and decoupling of drive and driven shafts in a variety of selectable speed ratios with expenditure of only relatively small control forces in favorable directions.

The art of speed-changing is of course well developed and includes numerous provisions for the changing of gear ratios which are effective between input and output shafts. In general, such devices, when designed to afford a wide variety of output speeds, tend to be complex, costly to fabricate, bulky, demanding of relatively high control power to effect shifting, and subject to uncertainties and lack of precision in their translations of motion. Teachings of the present invention are aimed at improvements in such areas, and share in common with prior techniques the use of gearing and clutching for purposes of achieving the desired transmissions. However, important and advantageous differences are expressed in a stationary compact transmission array of rotable gearing and associated axially-shiftable clutches which may be selectably actuated by a unique and uncomplicated rotatable detenting and indexing assembly, the latter featuring provisions which inherently insure full decoupling between speed changes and which require only relatively low-torque angular stepping to effect these changes by way of either manual or electrical stepping-motor control.

Accordingly, it is one of the objects of the present invention to provide novel and improved high-precision mechanical transmissions of compact and economical construction which operate reliably, in response to low-power control commands, to vary the speed ratios between drive and driven shafts.

Another object is to provide unique speed-changing apparatus in which a clustered plurality of shafts rotated at different speeds are selectably coupled into independent driving relationship to an output member by way of clutches separately actuated by an indexed speed selector which is itself well isolated from the power-flow paths.

A further object is to provide a variable-speed drive wherein advantageously-arrayed clutch and gear mechanisms in a stationary assembly may be reliably and precisely controlled to effect motion changes in accordance with angular positioning of a low-torque rotatable speed selector.

Still further, it is an object to provide new and useful speed-change equipment of exceptional mechanical nicety which uniquely and reliably responds to remote speed-selector control by an electrical stepping motor.

By way of a summary account of practice of this invention in one of its aspects, the drive shaft of a conventional power source is geared in a different-speed driving relationship to each of a circular stationary array of parallel rotatable shafts each carrying a drive clutching element at one end. A cooperating set of rotatable driven clutching elements is provided in a like circular array in a stationary framework which supports each of the driven elements in the set for independent axial movement into engagement with a different one of the drive elements against the axial restraint of a spring. Each driven clutch element is fixed with a similar axially-slidable planet gear meshed with a sun gear, and an output gear, the speed of which is to be controlled, receives driving forces from one of the planet gears. At one axial end of the stationary framework for the driven clutch elements, small axially-movable clutch actuators are mounted in a normally flush relationship with a framework plate, in a circular array about a central axis. Detent formations in these actuators, and in the plate at intermediate angular positions, are disposed to receive and separably locate an indexing and clutch-actuating ball spring-supported on an angularly-movable speed-selector arm extending radially from the aforementioned axis. Rotation of the speed-selector arm to selected angular indexed position effects either full declutching of the transmission or rotation of the output gear at a distinctive speed in relation to the speed of the input drive shaft.

Although the aspects and features of this invention which are believed to be novel are expressed in the appended claims, additional details as to preferred practices and embodiments, as to the further advantages, objects and features thereof, may be most readily comprehended through reference to the following description taken in connection with the accompanying drawings, wherein:

FIGURE 1 illustrates an embodiment of an improved variable-speed electrically-shifted transmission designed for remote actuations;

FIGURE 2 provides a partly cross-sectioned enlarged view of the same transmission with a portion broken away;

Figure 1:
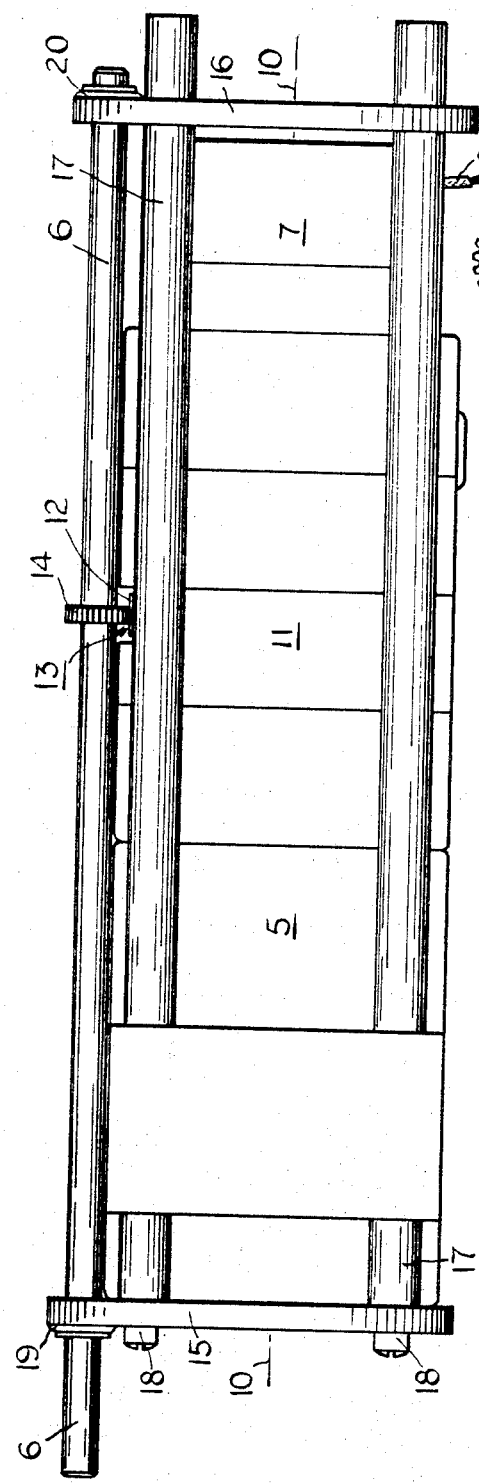
Figure 2:
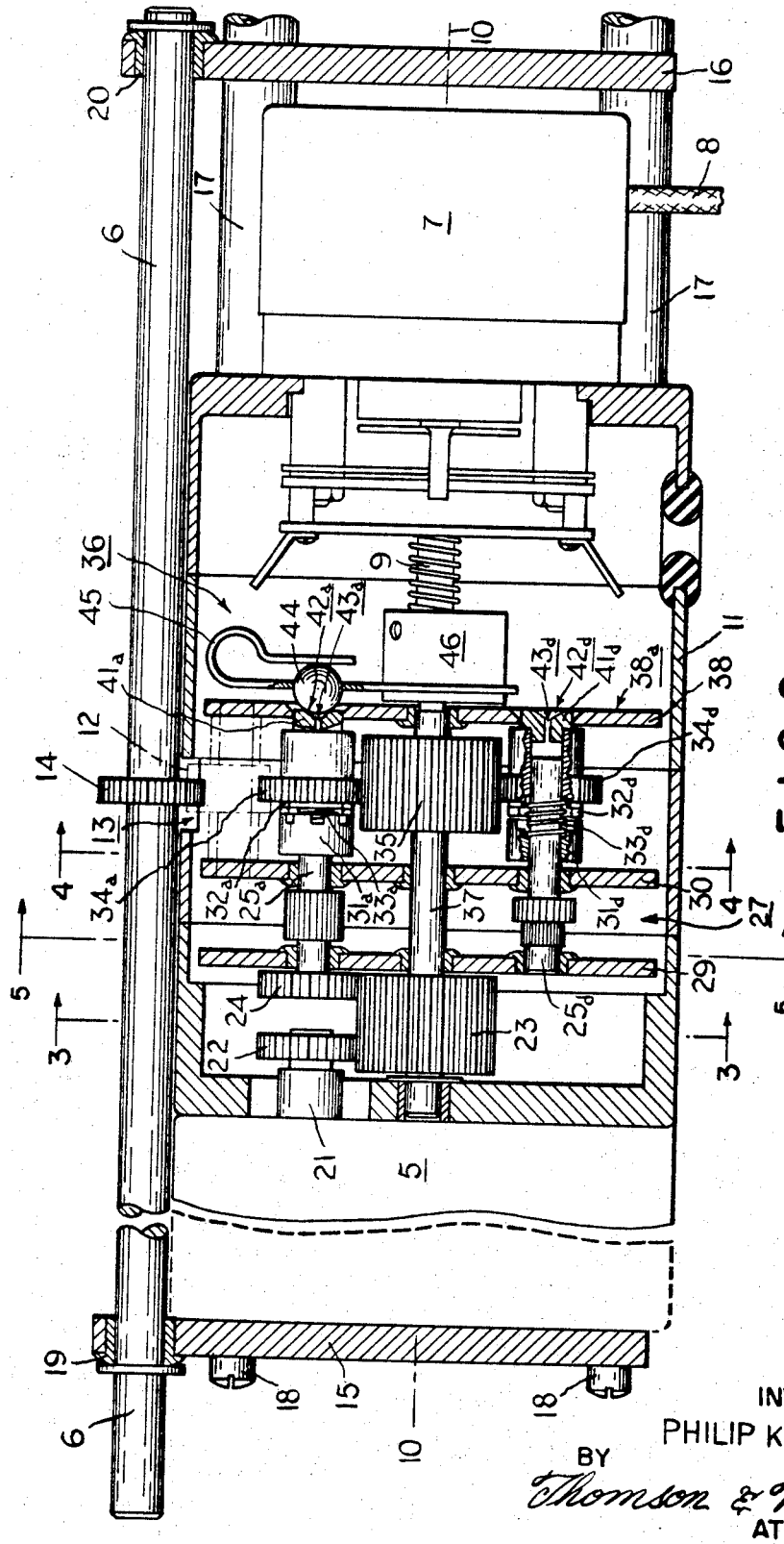

In the selectably-changeable speed-rationing apparatus portrayed in FIGURES 1 and 2, the rotational outputs of mechanical power from a source 5, shown in the form of an electric motor, are to be translated into corresponding angular movements of an output shaft 6 at any one of a predetermined number of preestablished speed ratios, under control of a known solenoid-type electrical stepping motor 7 which responds to each remotely-originated electrical impulsing via its input cabling 8 by turning a shaft 9 through a predetermined angle in a conventional manner. External remote electrical switching circuitry, the details of which are not of concern here, may serve to command the stepping-motor output shaft 9 to take up any one of a number of predetermined angular positions about the longitudinal axis 10—10, or, alternatively, that shaft may be angularly indexed manually to such positions. A stationary cylindrical turret or housing, 11, is joined with the casing of drive motor 5 at one end and with the casing of stepping motor 7 at the other, and translates their influences into control of the movements of a laterally-disposed power take-off gear 12 which extends through a slot 13 in turret 11 and is meshed in driving relationship to a gear 14 fixed with the laterally-disposed output shaft 6. The entire transmission assembly is mounted between a spaced pair of end plates 15 and 16 which cooperate with spacers 17 and draw bolts 18, the spaced bearings 19 and 20 for the output shaft also being supported by these end plates.

Figure 5:
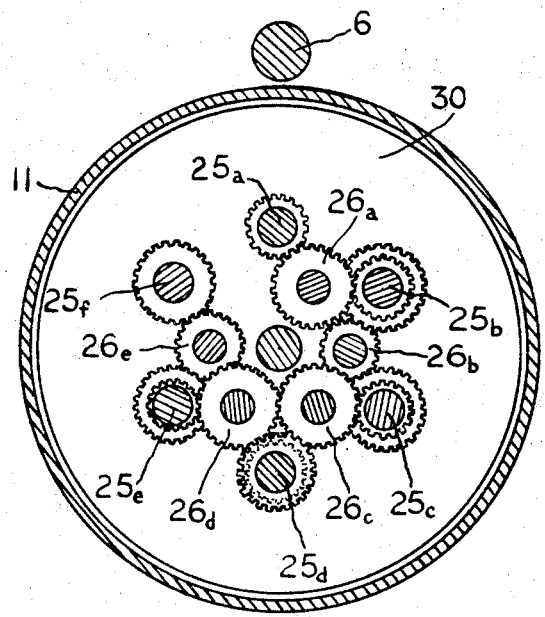
FIGURE 5 is a transverse cross-section taken along section line 5—5 in FIGURE 2.

Drive motor shaft 21 operates a pinion gear 22 enmeshed with an input sun gear 23, and the latter in turn causes rotation of an input pinion 24 which serves to drive six intermediate output shafts 25a–25f (FIGURE 3) at predetermined different speeds established by the speed ratios of their drive gearing such as gears involving the idlers 26a–26e shown in FIGURE 5. For purposes of simplification, not all of such drive gearing is illustrated in the accommodating space 27 in FIGURE 2, but the principles and design means for effecting the desired directions and different speeds of the intermediate output shaft rotations are of course well understood and need not be exemplified beyond what is shown in and evident from FIGURE 5. All of the intermediate output shafts 25a–25f are parallel with and clustered circularly and symmetrically about axis 10—10, with equi-angular spacing; stationary spaced frame members 29 and 30 provide bearing supports for these rotatable shafts. Forwardly of the bearing plate 30, each of the shafts 25a–25f carries an affixed drive clutch element, 31a–31f, respectively, each disposed in axial alignment with a different one of six cooperating driven clutch elements, such as elements 32a and 32d (FIGURE 2), which are each axially slidable on the same shaft and rotatable relative to the cooperating drive element about the same supporting shaft (of shafts 25a–25f) when axially disengaged from the drive element. Helical springs, such as springs 33a and 33d, normally maintain the cooperating drive and driven clutch elements out of clutching engagement. Each driven clutch element is in fixed relation to a different one of clutch gears 34–34f, respectively, which are meshed with a common central output sun gear 35, such that rotation of any one of the clutch gears in turn causes synchronous rotation of that sun gear and all of the other clutch gears. Conveniently, the clutch gears are integral with the driven clutch elements and are axially slidable with them. Output gear 12, which drives the gear 14 affixed to output shaft 6, is meshed with one of the clutch gears, 34a in the example under discussion, and receives power from source 5 through whichever one of the driven clutch elements is engaged with its cooperating drive clutch element at any time. Only one of the six clutch units may be engaged at one time, with the result that all of the clutch gears are then rotated at the same one of six possible speeds, and the output shaft is correspondingly rotated at one of six possible speeds as determined by the speed ratio then established by the gearing effective between motor shaft 21 and the operated clutch unit. A substantially constant-speed motor 5 is preferably employed to pre-establish the selectable speeds when the output shaft feeds the mechanisms of a sensitive instrument requiring such speeds of inputs, although a variable-speed power source may be employed in other instances where appropriate.

Figure 4:
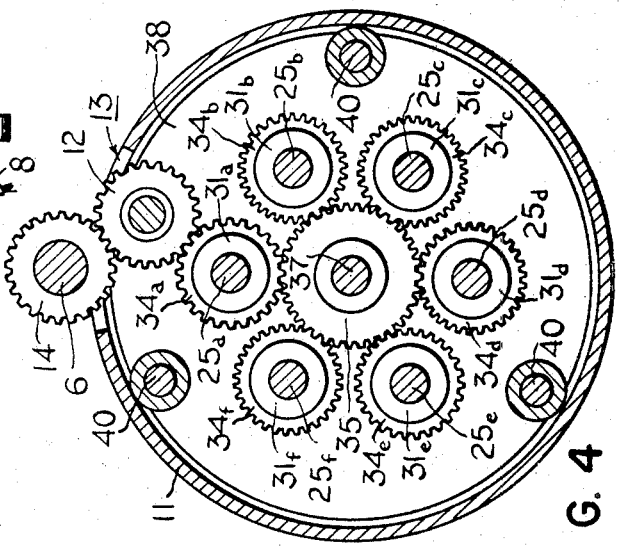
FIGURE 4 is a transverse cross-section taken along section line 4—4 in FIGURE 2.
Figure 3:
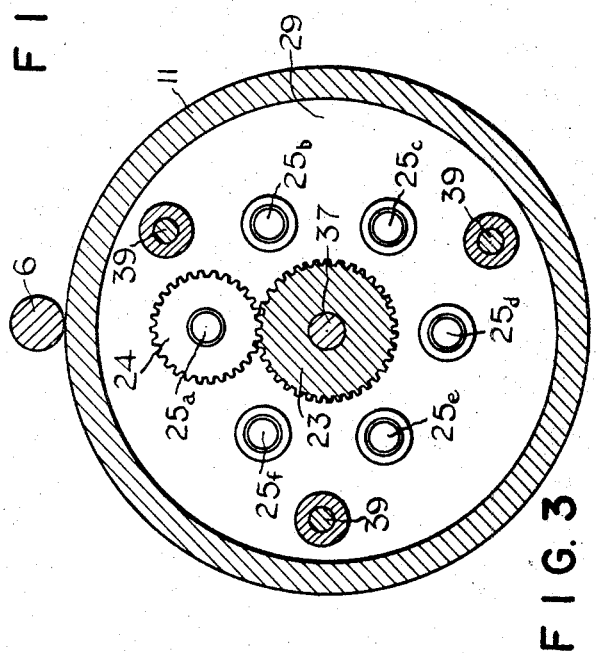
FIGURE 3 is a transverse cross-section taken along section line 3—3 in FIGURE 2.

Independent selection of any one, or none, of the available speed ratios (six, in the illustrated embodiment) is uniquely attained by way of an angularly-movable and indexed speed-selector arrangement 36 which is angularly adjustable about the longitudinal axis 10—10 on selector shaft 9. The latter shaft is preferably collinear with the shaft 37 on which the input and output sun gears 23 and 35 are mounted; however, it should be understood that the mechanical interrelationships are chosen so that the two sun gears and the selector shaft 9 are all left freely rotatable in relation to one another. Each of the driven clutch-and-gear assemblies is axially restrained in the disengaged position by a detent plate 38, the latter being held parallel with and supported in fixed relation to the bearings plates 29 and 30 by spacer-bolt units 39 and 40 (FIGURES 3 and 4). Preferably, each of these driven clutch-and-gear assemblies includes a forwardly-projecting central cylindrical bearing plug, such as the plugs 41a and 41d, which is axially-slidable in the detent plate 38 against the opposing force of the associated clutch-disengaging spring, such as springs 33a and 33d. Normally, the forward ends of these plugs are flush with the front surface 38a of the detent plate, except for their central countersinkings, 42a and 42d, and air-relief holes, 43a and 43d. Whenever one of the clutch units is to be engaged, the speed-selector 36 is indexed to the proper angular position about axis 10—10, and the ball member 44 trapped between a radial folded-back spring arm 45 and the front surface 38a of the detent plate will then become indexed in the countersinking of the plug, forcing that plug rearwardly against the restraint of the clutch spring and causing the associated drive and driven clutch elements to become engaged. For this purpose, the speed-selector spring arm 45 is designed to exert a rearward force through ball 44 greater than that of the individual clutch springs. A hub 46 supports spring arm 45 in angularly-fixed relation to the speed-selector shaft 9. The clutch-engaged and disengaged conditions are exemplified in FIGURE 2 in connection with the clutch elements 31a and 31d. Each of the six countersunk plugs, such as plugs 41a and 41d, having equi-angular spacings about axis 10—10, provides an indexing or detenting for the ball member 44 at a different position representing a different available speed ratio. In addition, one or more like countersinkings is provided (not visible in the drawings) in the detent plate 38 itself, between adjacent plug positions, such that the selector arm may be securely located or indexed at these angular orientations whenever it is desired to fully declutch the entire transmission. It will be appreciated that no clutching occurs while the ball member 44 is rested against or rides upon detent plate 38 alone, and that the ball configuration promotes low-torque turning characteristics for the selector shaft 9 even though relatively large axial spring forces are exerted by spring arm 45. Air relief holes such as 43a and 43d vent the interiors of the axially-slidable clutch units, thereby preventing pneumatic damping which could otherwise render clutch disengagements sluggish in the illustrated design. In addition, the clutch teeth may be tapered to impart a dynamic clutch-disengaging characteristic where desirable.

As has been mentioned earlier herein, the speed ratios may be selected manually, by rotation of control shaft 9, and the number of ratios to be selected, and the directions of output movements, may readily be varied to meet specific requirements. The illustrated toothed clutching may employ specially-shaped teeth, or may be replaced by alternative clutching elements, with the normally-disengaged biasing being provided by means other than the helical springs shown. Although the spherically-shaped clutching actuator 44 is particularly advantageous, its function may be discharged by an actuator of different form, and the axial spring-biasing may similarly be accomplished by means other than a spring arm. The preferred array for the detent-type clutch-actuating members is circular, though this is not a limiting condition. Power flow may be in a direction which is the reverse of that discussed for the illustrated embodiment.

Accordingly, it is to be understood that the specific embodiments and practices herein described have been presented by way of disclosure rather than limitation, and that various modifications, substitutions and combinations may be effected by those skilled in the art without departure in spirit or scope from this invention in its broader aspects and as set forth in the appended claims.

What I claim as new and desire to secure by Letters Patent of the United States is:

1. A selectable-speed transmission comprising a plurality of shafts each rotatable about a different one of substantially parallel axes, motive means for rotating said shafts simultaneously at different speeds, a plurality of driving clutch elements each rotatable with a different one of said shafts, a plurality of driven clutch elements each disposed for clutching independently with a predetermined different one of said driving clutch elements, a plurality of biasing means each independently and yieldably maintaining a different one of said driven clutch elements unclutched in relation to the cooperating one of said driving elements, movable output means, means interconnecting all of said driven clutch elements for rotation together in driving relation to said output means, and speed-selector means including means for independently and selectably overcoming the biasing effect of each different one of said biasing means and thereby clutching cooperating ones of said elements.

2. A selectable-speed transmission as set forth in claim 1 including an array of a plurality of clutch-actuating members in spaced relationship to one another and each independently movable in a predetermined direction to overcome the biasing effect of a different one of said biasing means and thereby to clutch cooperating ones of said elements, and wherein said speed-selector means includes a speed-selector arm, and means for moving said speed-selector arm across said array and into independent pressure engagements with different ones of said clutch-actuating members which move each of said members in said direction.

3. A selectable-speed transmission as set forth in claim 2 wherein each of said clutch-actuating members comprises a member fixed in relation to a different one of said driven clutch elements, means mounting each of said members in a fixed position relative to a plate member for depression in relation to said plate member in said direction upon engagement by a wiper, and wherein said speed-selector arm comprises a wiper and means resiliently urging said wiper toward said plate member and into said pressure engagements with said clutch-actuating members, said clutch-actuating members in said array being in spaced relationship whereby said wiper is alternately separated from and engaged with successive ones of said clutch-actuating members upon movement thereof by said moving means.

4. A selectable-speed transmission as set forth in claim 3 wherein said array of said clutch-actuating members is substantially circular about an axis, wherein said plate member is substantially transverse to said axis and said clutch-actuating members are normally substantially flush with one surface of said plate member, wherein said speed-selector arm is angularly adjustable about said axis, and wherein said resiliently-urging means urges said wiper substantially axially toward said surface of said plate member.

5. A selectable-speed transmission as set forth in claim 4 further including cooperating detent means on said speed-selector arm and each of said clutch-actuating members, whereby said detent means tend to locate said speed-selector arm angularly about said axis at the clutching positions.

6. A selectable-speed transmission as set forth in claim 5 wherein said plate member further includes detent means at said surface between positions of said clutch-actuating means and cooperating with said detent means of said speed-selector arm to locate said arm angularly at positions wherein none of said clutching elements are clutched.

7. A selectable-speed transmission as set forth in claim 6 wherein said wiper and detent means for said speed-selector arm comprises a spherically-shaped member, and wherein said detent means for clutch-actuating members and plate means include surfaces countersunk in relation to and disposed for locating engagements with said spherically-shaped member.

8. A selectable-speed transmission as set forth in claim 7 wherein said speed-selector arm includes a resilient member extending radially about said axis and holding said spherically-shaped member at a predetermined radial position therealong and resiliently urging said spherically-shaped member substantially axially toward said plate member and clutch-actuating members.

9. A selectable-speed transmission as set forth in claim 4 wherein said motive means comprises a substantially constant-speed electric motor, wherein said movable output means comprises a rotatable shaft and gear means connecting said rotatable shaft in driven relation to one of said driven clutches, and further comprising electrical stepping-motor means, and means connecting said stepping-motor means in angular driving relationship to said speed-selector arm about said axis.

10. A selectable-speed transmission comprising a plurality of shafts, stationary frame means mounting each of said shafts for rotation about a different one of substantially parallel axes, gear means connecting each of said shafts with a first power shaft with a different predetermined speed ratio, a plurality of cooperating pairs of clutch elements on each of said plurality of shafts and including a first clutch element angularly fixed therewith and a second clutch element rotatable thereon and axially slidable therealong into and out of clutching engagement with the first clutch element, spring means normally urging the clutch elements of each pair axially out of engagement, a second power shaft, gear means connecting each of said second clutch elements with said second power shaft, and speed-selector means including means for independently and selectably urging each different one of said second clutch elements axially into clutching engagement with the cooperating one of said first clutching elements.

11. A selectable-speed transmission as set forth in claim 10 wherein said speed-selector means includes a plurality of clutch-actuating members each axially slidable with a different one of said second clutch elements at an end of one of said plurality of shafts, said clutch-actuating means having ends disposed in substantially the same plane in a substantially circular spaced array about an axis, a speed-selector arm, and means for angularly indexing said arm about said axis to positions at which said arm independently engages different ones of the ends of said clutch-actuating members and independently slides said clutch-actuating members axially to engage the clutch elements in a different one of said pairs of elements.

12. A selectable-speed transmission as set forth in claim 11 further comprising a stationary detent plate fixed with said frame means, said plate having a surface substantially coplanar with said ends of said clutch-actuating members, wherein said speed-selector arm includes a wiper engageable with said plate and said ends of said clutch-actuating means, and means resiliently urging said wiper substantially axially toward said plate, and further including detent means on said plate and ends of said clutch-actuating members disposed to locate said wiper angularly about said axis.

13. A selectable-speed transmission as set forth in claim 12 further comprising electrical stepping-motor means, and means connecting said stepping-motor means in angular driving relationship to said speed-selector arm about said axis, wherein said gear means connecting said second clutch elements with said second power shaft includes a plurality of like gears each fixed with a different one of said second clutch elements and a sun gear rotatable about said axis in meshed relationship with all of said like gears.

14. A selectable-speed transmission as set forth in claim 13 wherein said clutch-actuating members comprise plugs each fixed with a different one of said second clutch elements at the end of and collinearly with a different one of said plurality of shafts, said plugs each including an opening venting the axial space between it and the cooperating one of said plurality of shafts, wherein said wiper includes a ball member, and wherein said detent means includes surfaces countersunk in said plate and said ends of said plugs to detent with said ball member.

References Cited

UNITED STATES PATENTS

| | | | |
|---|---|---|---|
| 3,367,200 | 2/1968 | Cummings | 74—329 |
| 2,819,622 | 1/1958 | Harton | 74—353 |
| 3,113,468 | 12/1963 | Humphrey | 74—331 |
| 3,358,525 | 12/1967 | Clarke | 74—331 |

FRED C. MATTERN, JR., *Primary Examiner.*

H. S. LAYTON, *Assistant Examiner.*